United States Patent [19]

Khattak

[11] Patent Number: 5,227,910
[45] Date of Patent: Jul. 13, 1993

[54] HIGH RESOLUTION LASER BEAM SCANNER AND METHOD FOR OPERATION THEREOF

[76] Inventor: Anwar S. Khattak, 612 S. Lincoln, Spokane, Wash. 99204

[21] Appl. No.: 859,025

[22] Filed: Mar. 27, 1992

[51] Int. Cl.$^5$ ............................................. G02B 26/08
[52] U.S. Cl. ..................................... 359/211; 359/209
[58] Field of Search ............... 359/210, 205, 206, 207, 359/208, 209, 211, 220, 831; 250/235, 236

[56] References Cited

U.S. PATENT DOCUMENTS

| | | | |
|---|---|---|---|
| 3,720,454 | 3/1973 | Inderhees | 359/209 |
| 4,118,109 | 10/1978 | Crawford et al. | 359/211 |
| 4,348,108 | 9/1982 | Shindow | 359/211 |
| 4,376,582 | 3/1983 | Kirchner et al. | 359/211 |
| 4,414,684 | 11/1983 | Blonder | 359/211 |
| 4,544,228 | 10/1985 | Rando | 359/211 |
| 4,629,283 | 12/1986 | Plaot | 359/208 |
| 4,773,754 | 9/1988 | Eisele | 359/211 |
| 4,822,974 | 4/1989 | Leighton | 359/211 |
| 5,074,628 | 12/1991 | Khattak et al. | 359/205 |

OTHER PUBLICATIONS

Khattak, Anwar S., et al., "Refractive Scanner Removes Tracking Errors Economically", *Laser Focus World*, pp. 73-79 (Mar. 1992).

*Primary Examiner*—Loha Ben
*Attorney, Agent, or Firm*—Wells, St. John, Roberts, Gregory & Matkin

[57] ABSTRACT

A laser beam scanner in its preferred form has a laser source which emits a laser beam at a prism. The prism receives and deflects the laser beam toward a spherical lens, which receives the laser beam and converges it. A spherical reflector then redirects and focuses the converging laser beam to a laser scan spot along a scan line. The laser beam scanner may include one or multiple prisms, wherein individual prisms may be single or multi-faceted prisms. The laser beam scanner effectively eliminates across-scan error and generates a mathematically perfect scan line. The scanner has a high optical efficiency and a very short retrace time or blackout time. A method for laser scanning using a prism, spherical lens, and spherical reflector is also disclosed.

29 Claims, 9 Drawing Sheets

HIGH RESOLUTION LASER BEAM SCANNER AND METHOD FOR OPERATION THEREOF

TECHNICAL FIELD

The invention relates to laser beam scanners, and methods for laser beam scanning. This invention also relates to laser beam deflectors used within laser beam scanners.

BACKGROUND OF THE INVENTION

Advances in laser technology have led to applications in numerous new industrial and consumer products. The most commonly used laser beam scanners include polygonal mirror scanners, galvanometric scanners, holographic scanners, and acoustooptic beam deflectors. Modern laser beam scanners may be classified in two general categories: pre-objective scanners and post-objective scanners. Post-objective scanners are characterized by scanning along a curved track or image plane. In contrast, pre-objective scanners scan along a linear track or flat image plane. This invention relates primarily to pre-objective scanning configurations, although it may be adapted to a post-objective system.

The most commonly used laser beam scanners are employed in various applications, such as in laser printers, laser bar code readers, or the like. Modern laser printers employ conventional laser beam scanners which use a rotating mirror to direct a laser beam to a rotating drum. The laser beam inscribes several hundred dots per inch onto a photosensitive surface of the drum. The drum is then rotated and the photosensitive surface is treated with toner which adheres to the portions of the surface previously scanned. The drum is further rotated to transfer the toner image to a recording medium, such as paper.

Modern bar code readers employ a laser beam scanner having a mirror which guides the laser beam through a scanning sweep to read the bar code label on a product. The light output by the scanner is reflected from the product label and sensed by a photodiode. This optical signal is then converted to an electrical signal for computer use.

The use of a rotating polygonal mirror or a plain mirror is an essential component in modern scanners for precisely directing the laser beam towards a targeted scan track. Important parameters to be considered for an acceptable laser beam scanner include: scan rate, required accuracy of the system, available scan angle and system resolution, the ability to randomly access image points, power handling capability, and cost.

Figure 1:
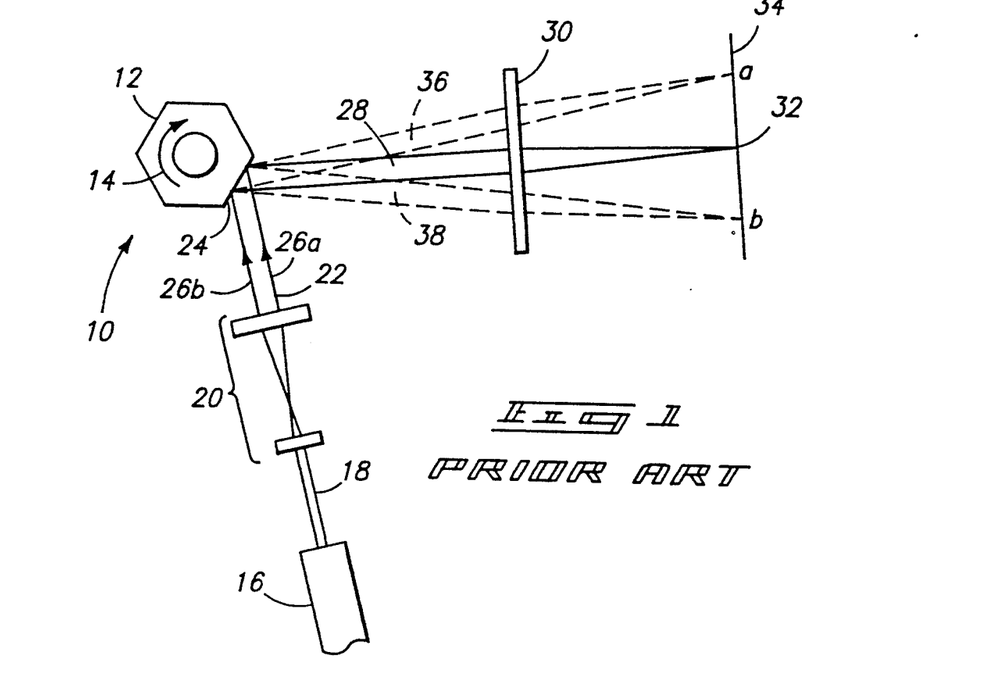
FIG. 1 is a diagrammatic illustration of a conventional laser beam scanner having a rotating polygonal mirror.

FIG. 1 illustrates a conventional laser beam scanner 10 having a rotating polygonal mirror 12 which rotates in a clockwise direction as indicated by arrow 14. Scanner 10 includes a laser source 16 for emitting a laser beam 18. A beam expander 20 is positioned between laser source 16 and polygonal mirror 12 to expand laser beam 18 to a laser beam 22 having a larger cross-sectional area. Expanded laser beam 22 is directed to a face 24 of rotating polygonal mirror 12. Laser beam 22 has marginal rays 26a and 26b which are deflected from face 24 of polygonal mirror 12 to provide a laser beam 28. Scanner 10 further includes scan lens 30 which focuses laser beam 28 onto a laser scan spot 32 along a scan line 34. In conventional laser beam scanners, laser spot 32 is approximately 85-140 microns in laser printer applications.

Laser beam 28 is directed onto scan lens 30 at different angles as polygonal mirror 12 is rotated. For example, as polygonal mirror 12 rotates in the clockwise direction, laser beam 28 sweeps from an initial position illustrated in dashed lines as laser beam 36 to a final position illustrated in dashed lines as laser beam 38. A sweep of laser beam 28 results in a uni-directional scan from point a to point b along scan line 34.

Polygonal mirror 12 rotates in a single direction which effectuates a one way scan along scan line 34. When laser spot 32 has traversed the scan plane from point a to point b, laser spot 32 "jumps" back to point a, leaving the return trip (i.e., a laser scan along scan line 34 from point b to point a) unused.

A rotating polygonal mirror 12 is the most popular scanning equipment component in numerous modern laser scanning devices. Unfortunately, this component is also one of the most limiting components in terms of function and cost. The polygonal mirror is usually mounted to a shaft connected to a motor which rotates the mirror at a desired angular velocity. As the weight of a polygonal mirror increases and/or the angular velocity increases, the rotating polygonal mirror experiences undesired wobbling due to irregularity in bearings. Such wobbling degrades scan trace quality and often results in a significant "across-scan error". Across-scan error is the deviation of the laser beam spot from the desired scan path. Across-scan error caused by polygonal mirror wobble increases with distance due to the divergence of the beam reflected from the facet of the polygonal mirror. Traditionally, to reduce the undesired effects of polygonal mirror wobble, scanner manufacturers have either employed precision motors with more rigid shafts, or have added error correction components to remove wobble-induced tracking errors. Various polygonal scanners and corrective measures are discussed in *Optical Scanning by Gerald Marshall*, chapter two, polygonal scanners, Randy J. Sherman, pages 63-123. However, incorporating a precision motor or error correction components significantly increases the fabrication cost of a laser scanning system.

Another disadvantage with using a rotating polygonal mirror is that the scanning angle is restrictive. Scan angle is directly related to the facet width of the polygonal mirror. Laser beam scanners employing polygonal mirror experience a tradeoff between scan speed and scan angle. Polygonal mirrors having a few wide facets can produce a reasonable scan angle, but only at a low scan rate. On the other hand, polygonal mirrors with a large number of facets can scan at a much higher rate, but only over a small scan angle. Alternatively, polygonal mirrors may be constructed much larger to accommodate many "wide" facets, but the mass of such mirrors are impractical in terms of manufacturing costs and the construction of more powerful motor drive systems necessary to rotate large mirrors.

My U.S. Pat. No. 5,074,628, entitled "Laser Beam Scanning Device and Method for Operation Thereof" describes a laser scanning device which reduces across-scan error. The laser scanning device employs a prism to continuously deflect a laser beam to generate a conical-shaped laser beam, which when intercepted produces an inscribed circle. The inscribed circle is collapsed by a plano-cylindrical lens and scan lens to provide uni-directional or multi-directional scanning along several different scan tracks. The plano-cylindrical lens used to collapse the inscribed circle produces a substantially short scan line (as opposed to an elliptical or circular scan spot), which is desirable in some applications such as linear detector arrays.

The present invention is designed to substantially reduce or eliminate the problems associated with wobble, such as across-scan error, and to provide a non-restrictive scanning angle. Additionally, the present invention is designed to produce a substantially elliptical or circular scan spot of significantly small size because of reduced aberrations in order to provide a very high resolution per scan.

BRIEF DESCRIPTION OF THE DRAWINGS

Preferred embodiments of the invention are described below with reference to the accompanying and following drawings.

FIG. 14 is a diagrammatic illustration of a laser beam scanner employing a two prism beam deflector as illustrated, for example, in FIGS. 8 and 13.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 2:
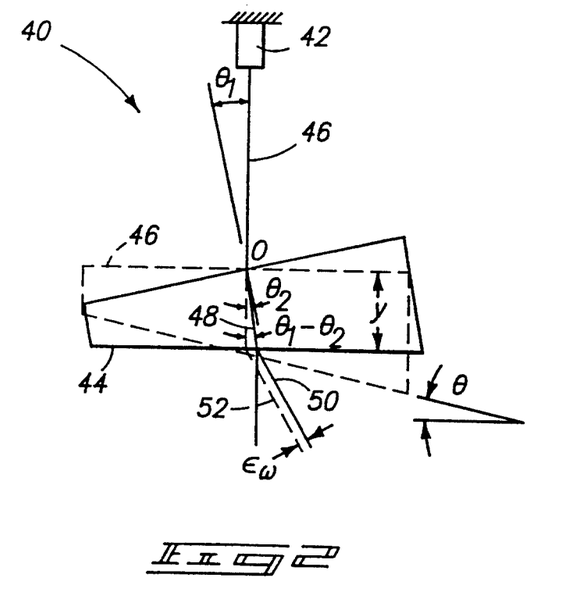
FIG. 2 shows a prism and illustrates how a significant wobble is suppressed to an insignificant beam displacement.

FIG. 2 diagrammatically shows a portion of a laser beam scanner 40 having a laser source 42 and a prism 44. FIG. 2 is provided to illustrate the advantages of employing a prism beam deflector as opposed to a polygonal mirror used in conventional scanners. A significant advantage resulting from the use of a prism is the ability to substantially reduce problems associated with wobble, such as across-scan error.

Laser source 42 emits a laser beam 46 which is refracted and then deflected by prism 44. Prism 44 is shown tilted from an original position 46 (illustrated in phantom). This tilt is wobble induced and is grossly exaggerated to illustrate the advantages of using a prism deflector to overcome the problems associated with wobble. Prism 44 is tilted at a "wobble" angle $\theta_1$ with respect to normal n. Incident laser beam 46 enters prism 44 at wobble angle $\theta_2$ and is refracted by the prism. The internal refraction angle $\theta_2$ can be calculated using Snell's Law as follows:

$$n_1 \sin \theta_1 = n_2 \sin \theta_2$$

where, $n_1 = 1$, the refractive index of free space,
$n_2 =$ the refractive index of the prism material.

The refracted beam 48 travels through prism 44 at an angle $(\theta_1 - \theta_2)$ which is less than $\theta_2$. Beam 48 is then refracted again at the second face of prism 44 to produce exit beam 50. An exit beam that passes through untilted prism 46 (i.e., in the absence of wobble) is shown as a dashed line and referenced by numeral 52. Exit beams 50 and 52 are always parallel due to internal refraction phenomenon inherent in prisms. Displacement $\epsilon_\omega$, the distance between the two exiting beams 50 and 52, can be calculated for angle $(\theta_1 - \theta_2)$ according to the following relationship:

$$\epsilon_\omega \approx y \sin (\theta_1 - \theta_2)$$

where y is the thickness of the prism at its center.

One advantage of the invention that is apparent from this illustration is that the error (i.e., $\epsilon_\omega$) caused by wobble is significantly diminished and remains constant with distance from prism 44 because exit beams 50, 52 are always parallel. This is a significant advantage over polygonal mirror scanners in which wobble error increases proportionally with distance from the mirror.

Figure 3:
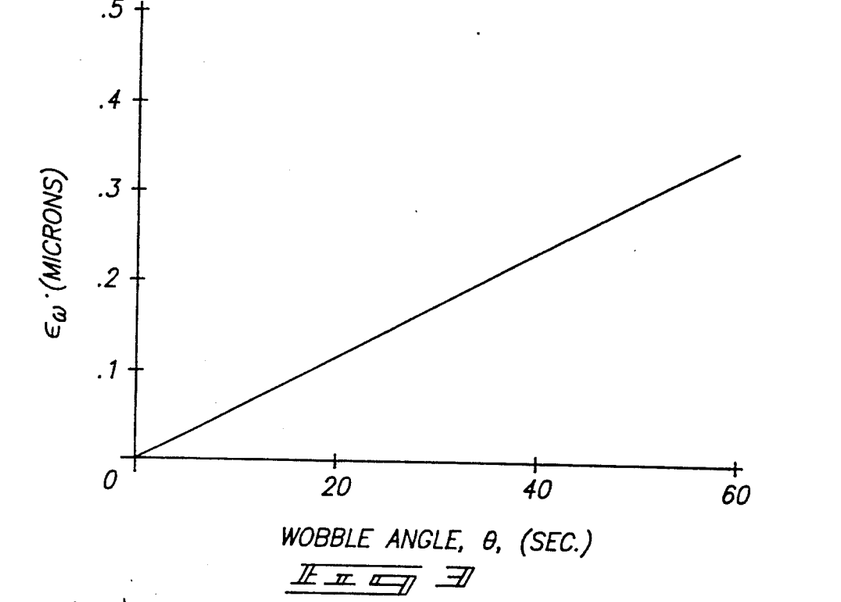
FIG. 3 is a graph demonstrating the relationship between a significant prism wobble which is transformed into an insignificant exit beam shift caused by the prism wobble shown in FIG. 2.

Displacement $\epsilon_\omega$ is associated with across-scan error. In a prism-based laser scanner such as the one shown in FIG. 2, displacement $\epsilon_\omega$ is practically negligible. In one experiment, laser source 42 emitted a helium neon (HeNe) laser beam of wavelength $\lambda = 632.8$ nm through a seven diopter prism with a refractive index of 1.515 and a thickness $y = 3.67$ mm. One "diopter" is defined as a one centimeter (1 cm) deflection of the laser beam at one hundred centimeters (100 cm) from the exit face of the prism. A Melles Griot Schott glass BK7 has been found to provide a suitable prism for such experiments. The prism has a diameter of 10 mm and a height at its small end of 3 mm. The prism was tilted through several different angles to imitate wobble. The relationship between wobble angle $\theta_1$ and displacement error $\epsilon_\omega$ is shown graphically in FIG. 3. As expected, the relationship is linear. At a significant 20 sec. wobble angle, an exit beam is only displaced $\pm 0.12$ micron. This displacement is less than 1000th of the laser scan spot diameter, which is, for example, 130-140 microns in a laser printer. Accordingly, despite a rather significant wobble in the deflector prism, the resulting error induced by the wobble is practically negligible.

Figure 4:
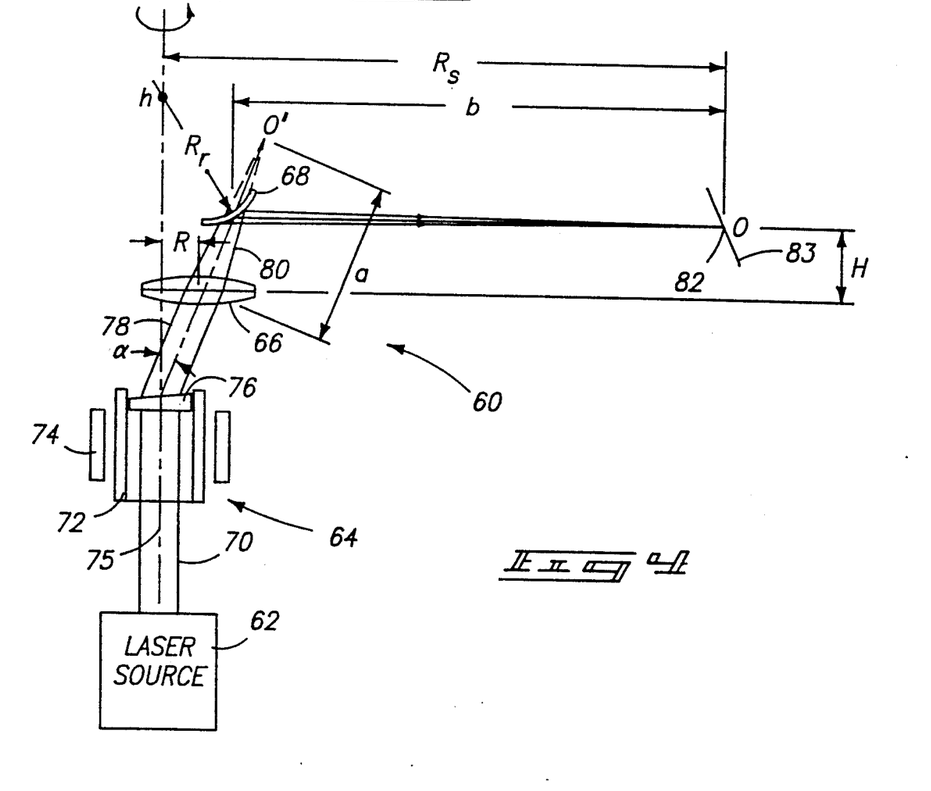
FIG. 4 is a diagrammatic view of a laser beam scanner according to one aspect of the invention.

FIG. 4 diagrammatically shows a laser beam scanner 60 constructed in accordance with an aspect of the present invention. Laser beam scanner 60 includes a laser source 62, a laser beam deflector assembly 64, a spherical lens 66, and a spherical reflector 68. Laser source 62 emits a laser beam 70, which is preferably collimated, along axis 75 toward laser beam deflector assembly 64. Laser source 62 can be a laser diode, a helium neon tube, a carbon dioxide laser, or other laser source means. In other embodiments, other types of light (i.e., electromagnetic spectrum) may be used. Additionally, in this diagrammatic illustration, laser source 62 could comprise a laser beam generator, a beam expander for increasing the cross sectional area of the laser beam, and a collimator for collimating the laser beam. For purposes of discussion, however, laser source 62 is illustrated as outputting a preferably collimated laser beam 70.

Laser beam deflector assembly 64 includes a rotating hollow shaft 72 which is driven by a motor 74. Deflector assembly 64 also includes a prism 76 which is mounted within, and at one end of, hollow shaft 72. Hollow shaft 72 and prism 76 are rotated by motor 74 about an axis of rotation 75. Prism 76 may be a single faceted prism, such as glass BK7. Alternately, prism 76 can be multi-faceted (such as prisms 142, 144 shown in FIG. 13 and discussed below in more detail). Prism 76 receives laser beam 70 and deflects it as laser beam 78 at an angle $\alpha$ to axis 75 toward spherical lens 66. Deflected laser beam 78 is also collimated. Deflection angle $\alpha$ of laser beam 70 is determined in accordance with the diopter value of prism 76. A preferred prism formed of glass BK7 has a seven diopter value, which means that the laser beam is deflected 7 cm from axis 75 at 100 cm from the exit face of prism 76.

Spherical lens 66 is preferably not aligned along axis 75, but is positioned to intercept at least a portion of deflected laser beam 78. As prism 76 is rotated about axis 75, deflected laser beam 78 traces at least a portion of a substantially circular path on spherical lens 66. The radius of the circular laser beam path on spherical lens 66 is radius R. Spherical lens 66 receives laser beam 78 deflected from prism 76 and converges the laser beam as laser beam 80 toward spherical reflector 68. Laser beam 80 is conical-shaped and converges to a focus point O' (which is an image of object O) beyond spherical reflector 68 as illustrated.

Spherical reflector 68 is positioned to intercept converging, conical-shaped laser beam 80 before it reaches focus point O'. Spherical reflector 68 redirects converging laser beam 80 to a laser scan spot 82 along a scan line 83. Spherical reflector 68 has a center of curvature h located on axis of rotation 75 and a radius of curvature $R_1$ defined by the following equation:

$$R_r = \frac{2ab}{2Rf\#\sin(\pi/N) - a} \quad [1]$$

where "a" represents the distance between the center of spherical lens 66 and focus point O'; "b" represents the distance between scan spot 82 and the center of spherical reflector 68; "f#" is the effective f-number at scan spot 82; and "N" represents the number of circular entrance apertures accommodated on the circumference of the circular laser beam path of radius R traced on spherical lens 66.

The combination of prism 76, spherical lens 66, and spherical reflector 68 provides significant advantages over conventional laser scanners. The most important and rather rare practical feature of such a combination is its ability to generate a mathematically perfect scan line straightness because radius of curvature $R_r$ of spherical reflector 68 and the location of its center of curvature h can be precisely determined. That is, center of curvature h is positioned along axis of rotation 75 and radius of curvature $R_r$ is defined by equation [1]. Additionally, laser beam scanner 60 substantially reduces or effectively eliminates across-scan error by virtue of employing prism 76.

Another significant advantage of laser beam scanner 60 is its ability to maintain a very small laser scan spot 82 at a very wide scan angle. A small scan spot and a wide scan angle result in a very high resolution scanner. The wide scan angle is achievable because laser beam 80 can freely trace a generous circular arc on spherical lens 66.

To better illustrate the advantages of laser beam scanner 60, consider the following example in which radius of curvature, scan spot size, resolution, and scan length are calculated for a given set of parameters. Assume the following parameters:

$\alpha = 20°$
$R = 30$ mm
$\lambda$ (operating wavelength of laser beam 70) = 632.8 nm
$b = 204$ mm
$a = 82$ mm
$f\# = 50$
$\delta$ (form factor) = 1.27
$R_s$ (scan radius) = 250 mm
$H = 45$ mm.

Substituting these values into equation [1] yields a radius of curvature $R_r$ of 81 mm. This radius of curvature will allow a mathematically perfect scan line. Focal length m of spherical reflector 68 is equal to radius of curvature $R_r$ divided by two (i.e., $m = R_r/2$) which is 40.5 mm.

Size s of laser scan spot 82 can be calculated according to the following equation:

$$s = \delta\lambda f\# = 40 \ \mu m \quad [2]$$

Before continuing our example to determine resolution and scan length, note that the size of laser scan spot 82 is remarkably small at only 40 μm. In comparison to spot sizes of 130-140 μm produced by conventional laser beam scanners, the scan spot size produced by laser beam scanner 60 is more than three times smaller at 40 μm. Even smaller scan spots are achievable with this invention. For instance, laser beam scanner 60 may be employed in microscopy to produce scan spots on the scale of less than 5 μm.

Resolution n is defined by the following equation:

$$n = \beta/\theta_s \quad [3]$$

where $\beta$ represents scan angle and $\theta_s$ represents angular resolution. Angular resolution $\theta_s$ equals spot size s divided by scan radius $R_s$ (i.e., $\theta_s = s/R_s$) which yields a value of $0.16 \times 10^{-3}$ radian. A reasonable value for scan angle $\beta = \pm 30°$ is assumed since the laser beam scanner has freedom of a wide scan angle. Inserting these values for scan angle and angular resolution into equation [3], a significantly high resolution of 6544 spots per scan is yielded.

Scan length L of the scan line may be computed from the following equation:

$$L = 2\beta R_s = 262 \ mm \approx 10 \ inches. \quad [4]$$

A scan length of 10 inches is more than sufficient for most laser scanning applications, such as laser printers.

Finally, if desired, the input beam entrance aperture $D_t$ size can be determined from one of the following equations:

$$D_t = 2R\sin(\theta/2), \text{ where } \theta = 2\pi/19 \qquad [5]$$
$$= 9.88 \text{ mm}$$

or, $$D_t = 2R\sin(\pi/N), \text{ where } N = 19$$
$$= 9.88 \text{ mm}.$$

From the above example, one can appreciate that laser beam scanner 60 provides a very high resolution and effectively eliminates any undesirable effects caused by wobble, such as across-scan error. Additionally, laser beam scanner 60 can be constructed to provide a mathematically perfect scan line.

Figure 5:
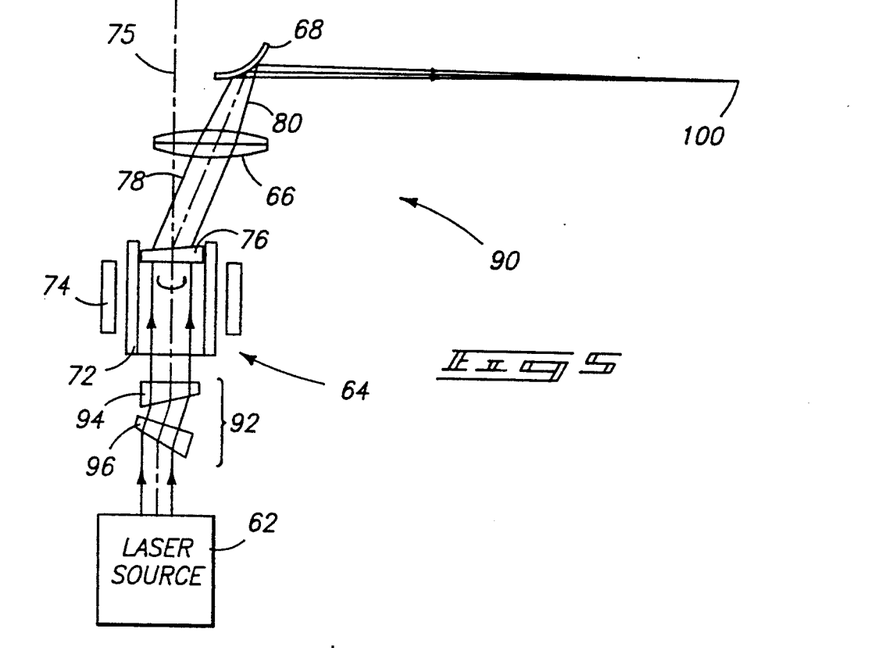
FIG. 5 is a diagrammatic illustration of the laser beam scanner shown in FIG. 4 with an additional laser beam adjustment component.

FIG. 5 diagrammatically shows a laser beam scanner 90 similar to the scanner shown in FIG. 4, but with the addition of a beam altering assembly 92. Beam altering assembly 92 is positioned between laser source 62 and prism 76. Preferably, beam altering assembly 92 comprises two anamorphic prisms 94 and 96. The purpose of beam altering assembly 92 is to effectuate a change in the shape of the produced laser scan spot. This change is best described with reference to FIGS. 6a and 6b.

Figure 6A:
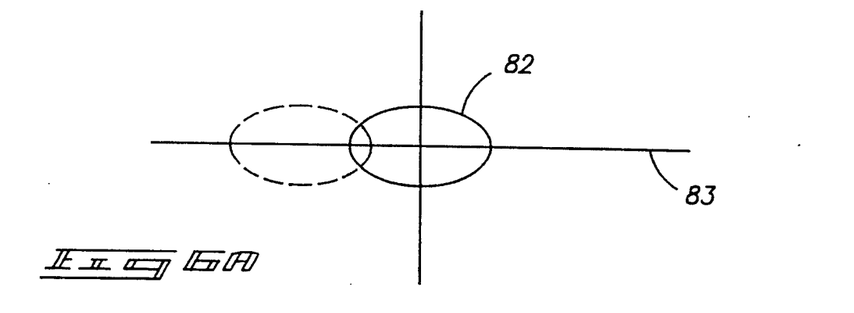
FIGS. 6a and 6b show enlarged laser scan spots formed by the laser beam scanners of FIGS. 4 and 5, respectively.

FIG. 6a shows a laser scan spot 82 produced by laser beam scanner 60 shown in FIG. 4. Laser scan spot 82 is elliptical with its major axis coinciding with scan line 83. The elliptical shape is often desirable because it provides a relatively generous overlap along the scan direction between adjacent scan spots. The elliptical shape also provides a minimum spot area overlap in the vertical direction perpendicular to the scan direction between scan spots on adjacent scan lines 83. Minimum vertical spot overlap, in this case, is the result of eliminating the across-scan error. Accordingly, elliptical scan spot 82 provides both desirable attributes.

Figure 6B:
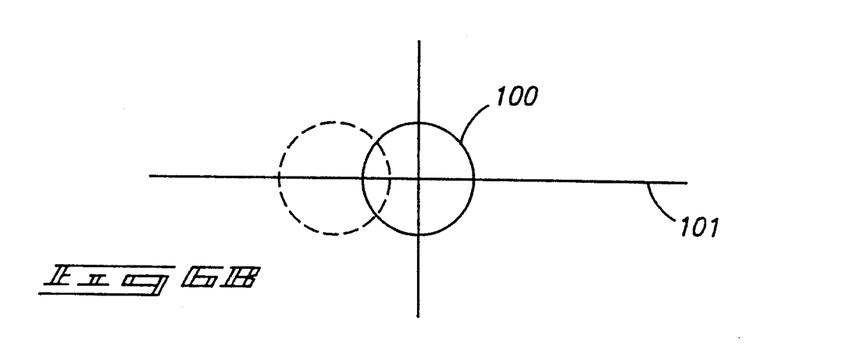

In comparison, FIG. 6b illustrates a substantially circular scan spot 100 produced by laser beam scanner 90 shown in FIG. 5. The substantially circular shape of scan spot 100 is produced by the addition of beam altering assembly 92. In other applications of laser scanners, a circular scan spot can be more desirable than an elliptical scan spot.

Figure 7:
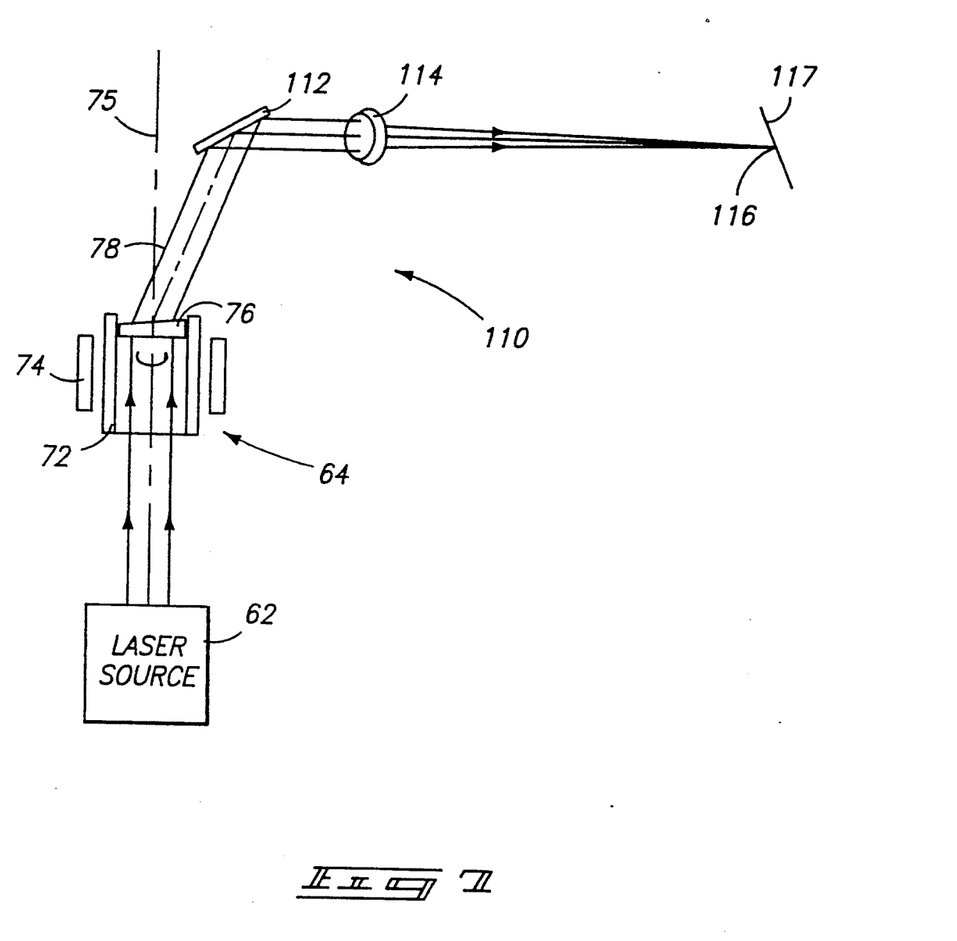
FIG. 7 is a diagrammatic illustration of a laser beam scanner according to another aspect of the invention.

FIG. 7 diagrammatically shows a laser beam scanner 110 according to another embodiment of the invention. Laser beam scanner 110 includes a laser source 62, laser beam deflector assembly 64, a folding mirror 112, and a scan lens 114. Laser source 62 and laser beam deflector assembly 64 are identical to that described above with reference to FIG. 4. Folding mirror 112 reflects the collimated laser beam 78 toward scan lens 114 which then focuses or converges the laser beam to a laser scan spot 116 along a scan line 117. Laser beam scanner 110 may also include a beam altering assembly like the one shown in FIG. 5 and discussed above.

FIGS. 8-12 illustrate a beam deflector assembly 120 according to another embodiment of the present invention. Laser beam deflector assembly 120 has a first prism 122 and a second prism 124. Preferably, prisms 122 and 124 are identical. Both prisms are rotatable about an optical axis 126. The unique scanning ability provided by this beam deflector assembly will now be described with reference to FIGS. 8-12.

Figure 8:
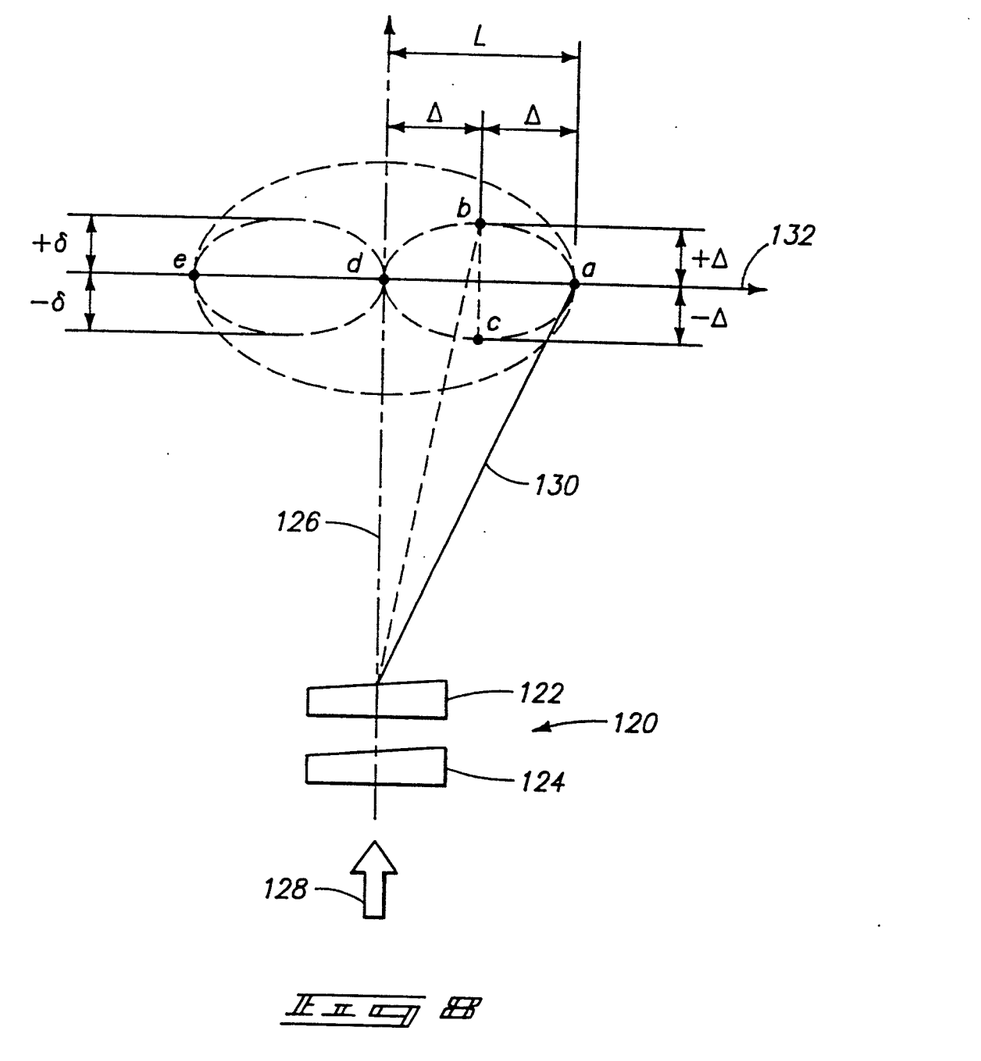
FIGS. 8-12 illustrate a scan track created through the use of two prisms in accordance with another aspect of the invention.

In FIG. 8, prisms 122 and 124 are initially oriented in exactly the same manner with respect to optical axis 126. A laser beam 128 is directed through prisms 122 and 124 in a direction coincident with optical axis 126. The laser beam exiting the beam deflector assembly is referenced by numeral 130. The cumulative effect of prisms 122 and 124 causes laser beam 128 to deflect an amount of 2Δ along the x-axis such that exiting beam 130 is located at point a.

Figure 9:
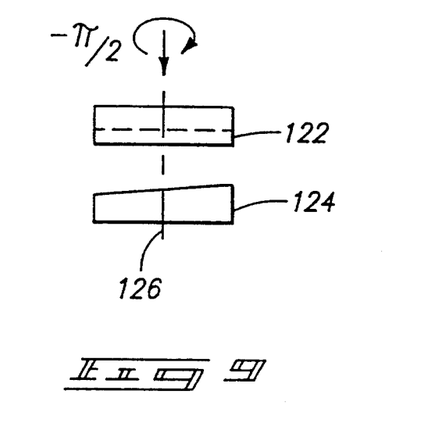

In FIG. 9, prism 122 is rotated through an angle $-\pi/2$ and prism 124 remains in its initial orientation. As a result of this rotation, exiting deflected laser beam 130 traces a path along a dotted arc from point a to point b. Deflected laser beam 130 has moved through a displacement Δ in a negative x-direction (leftward in FIG. 8) and has simultaneously gained an altitude +Δ in the positive y-direction (upward in FIG. 8).

Figure 10:
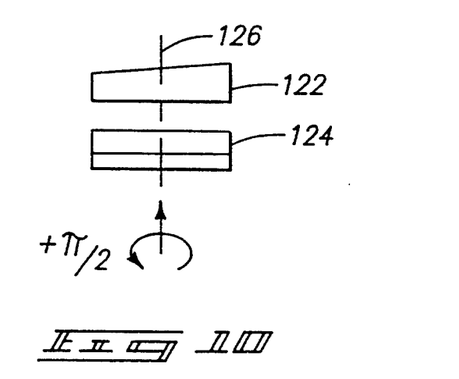

FIG. 10 shows prism 122 in its original orientation and prism 124 rotated through an angle $+\pi/2$. As a result of this rotation, deflected beam 130 traces a dotted arc from point a to point c. Laser beam 130 has moved through a displacement Δ in a negative x-direction and has simultaneously experienced a loss in altitude of −Δ along the y-axis.

Figure 11:
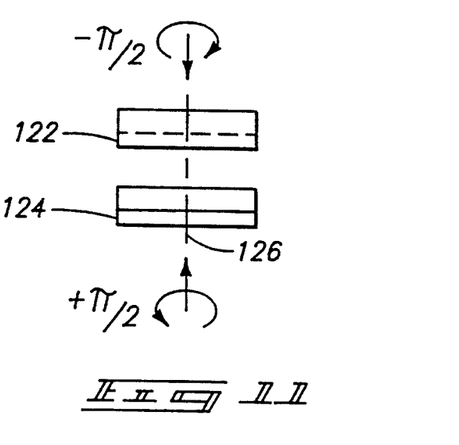

FIG. 11 shows prism 122 rotated through an angle $-\pi/2$ and prism 124 rotated through an angle $+\pi/2$, resulting in a relative rotation of 180° by both prisms. As a result of this simultaneous rotation, deflected beam 130 coincides with optical axis 126 and lies at point d. Deflected beam 130 has moved from point a by a total amount of 2Δ in the negative x-direction. On the other hand, the beam has realized no vertical displacement along the y-axis because any altitude gain +Δ resulting from the rotation of prism 122 is canceled by a corresponding altitude loss −Δ caused by the rotation of prism 124. Cancellation in the y-direction is realized by rotating prisms 122 and 124 in a synchronous motion in opposite directions. The cumulative effect of this simultaneous rotation is therefore a linear scan along scan line 132 (which is coincident with the x-axis).

Figure 12:
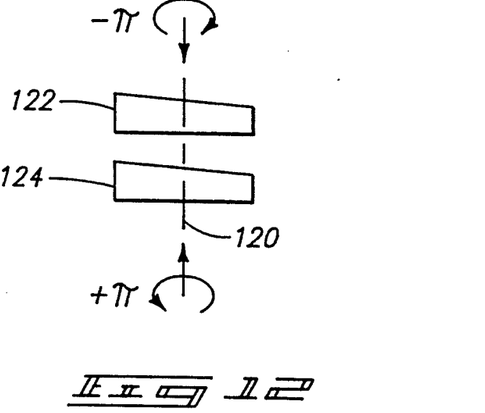

FIG. 12 shows prism 122 rotated through an angle $-\pi$ and prism 124 rotated through an angle $+\pi$ so that prisms 122 and 124 are completely opposite to their initial orientation shown in FIG. 8. As a result of this rotation, deflected beam 130 realizes a path from point d to point e along scan line 132. Again, any displacement in the y-direction ($+\delta$ or $-\delta$) is canceled.

When prisms 122, 124 are rotated in opposite directions back to their initial positions (FIG. 8), deflected beam 130 traces a return path from point e to point a. Thus, a linear scan may be achieved in both directions between points a and e. The resulting scan field along scan line 132 is equal to 4θ, where θ is the deviation angle of one of the two prisms. However, for optimum scan lens performance, a single continuous scan length L given by 2θf is true, where f is the calibrated focal length of the lens. The spot velocity at point d (in the middle of scan line 132) is zero. Scan length L is sufficient for many applications requiring short scan length (for example, laser ophthalmoscopes, microscopes, and semiconductor chip scanning). On the other hand, in other applications which require multi-directional scan length, such as in bar code reading, full scan length of 4θ may be desirable.

Figure 13:
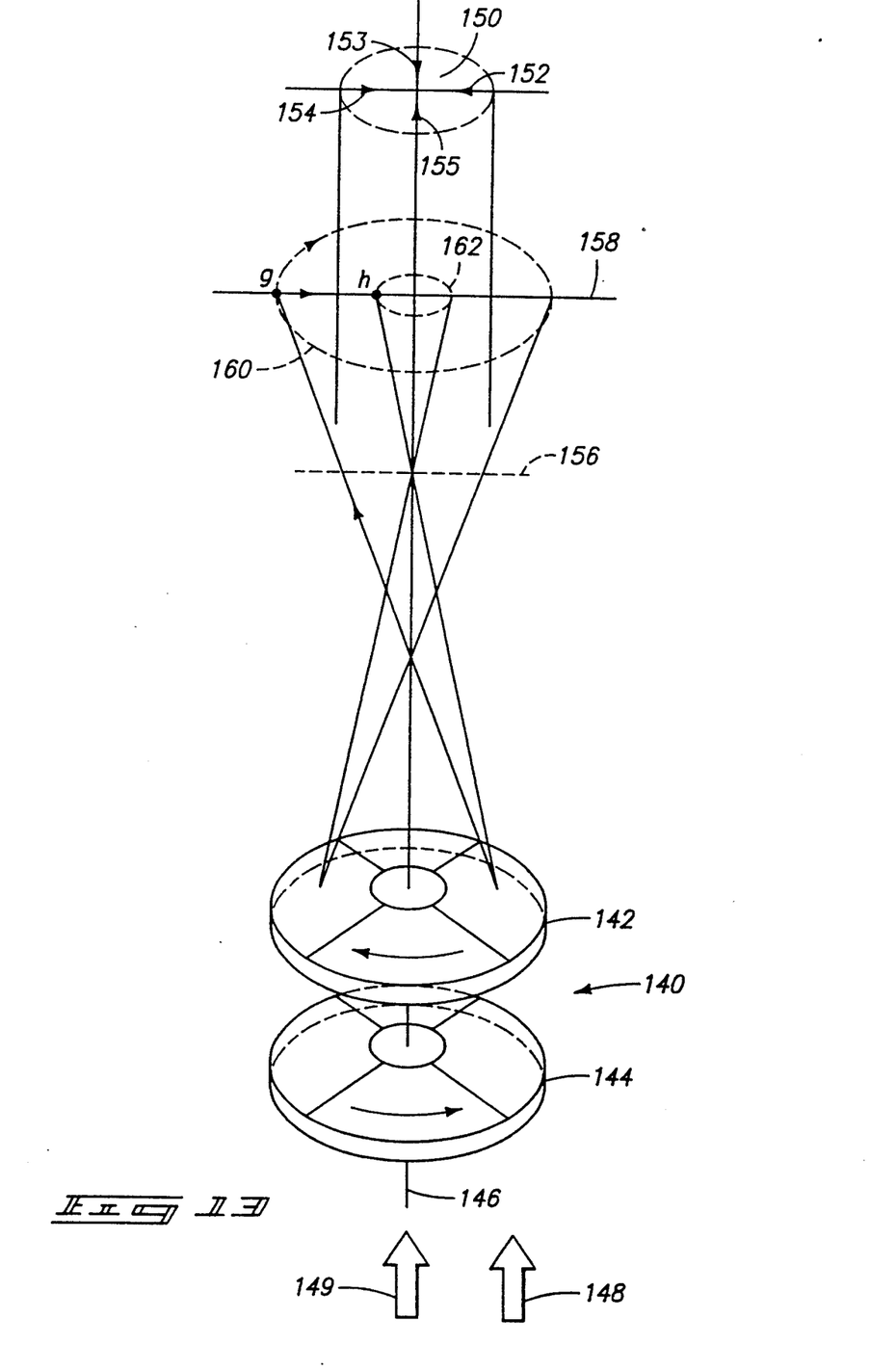
FIG. 13 illustrates a scan track created by two multi-faceted prisms in accordance with an aspect of the invention.

FIG. 13 shows a beam deflector assembly 140 having a pair of multi-faceted prisms 142 and 144. Prisms 142 and 144 are shown as having four facets, but may have more or less facets and still remain within the scope of this invention. Prisms 142 and 144 are aligned along, and rotatable about, an optical axis 146. Prisms 142 and 144 are rotated synchronously in opposite directions about optical axis 146.

A single laser beam 148 incident on one facet of prism 142 and one facet of prism 144 will result in four scans in a single revolution of the prisms, whereby the scan spot travels between point g and point h during one scan. On the other hand, if the input laser beam is simultaneously incident on all four facets of prisms 142 and 144 (as indicated by laser beam 149), four exit beams will exit collectively to provide a total of sixteen scans per revolution. The four deflected laser beams define orthogonal scan lines 152-155 in a "+" pattern which are referenced generally by numeral 150. Each scan line 152-155 receives four scans during each revolution. The "+" pattern 150 occurs at location 156 away from beam deflector assembly 140. At a location 158 farther from assembly 140, the four orthogonal scan lines will no longer intercept at the middle, but are instead defined between outer circle 160 and concentric inner circle 162 as shown in FIG. 13. However, this pattern is also generically referred to as a "+" pattern even though the scan lines do not meet in the middle. To achieve the "+" pattern, two identical prisms, each having four substantially equal facets, are employed. Different patterns may be achieved by prisms having more or less than four facets. For example, a pattern of an "×" superimposed on a "+" can be formed by an assembly employing two eight-faceted prisms.

Beam deflector assembly 140 produces a very high scan rate because multiple scans are made for each revolution. Beam deflector assembly 140 and its high scan rate is particularly useful for bar code reading applications. However, the scan length of beam deflector assembly 140 is relatively short in comparison to scan lengths yielded by the laser beam scanner shown in FIG. 4. Accordingly, applications of beam deflector assembly 140 is limited to those requiring a relatively short scan length.

FIG. 14 diagrammatically shows a laser beam scanner 170 which incorporates a multi-prism beam deflector assembly 172. Laser beam scanner 170 also includes a laser source 174 and a objective lens 176. Laser source 174 emits a preferably collimated laser beam 178 along an optical axis 180. Beam deflector assembly 172 includes a hollow shaft 182, a motor 184 which rotates shaft 182 about optical axis 180, and first and second prisms 186 and 188. Hollow shaft 182 has a longitudinal axis which coincides with optical axis 180. Hollow shaft 182 further includes a gear mechanism or other means 190 for rotating first prism 186 and second prism 188 in opposite directions about optical axis 180. Gear mechanism 190 may be constructed either inside or outside of hollow shaft 182. Motor 184, hollow shaft 182, and gear mechanism 190 provide a drive means for synchronously rotating first and second prisms 186, 188 in opposite directions about optical axis 180. First and second prisms 186, 188 receive laser beam 178 and deflect it as beam 192 toward objective lens 176. First and second prisms 186, 188 may be single faceted prisms, such as those shown in FIG. 8, or multi-faceted prisms, such as those shown in FIG. 13.

Objective lens 176 includes a focusing assembly 194 and a field flattening lens 196. Focusing assembly 194 focuses laser beam 192 to a scan spot 198 along one of several scan lines 200 and the field flattening lens 196 transforms the scan trace to a straight line 200. Field flattening lens 196 is necessary to "straighten" the laser beam so that it will traverse a linear scan line, as opposed to an arcing scan path.

Figure 15:
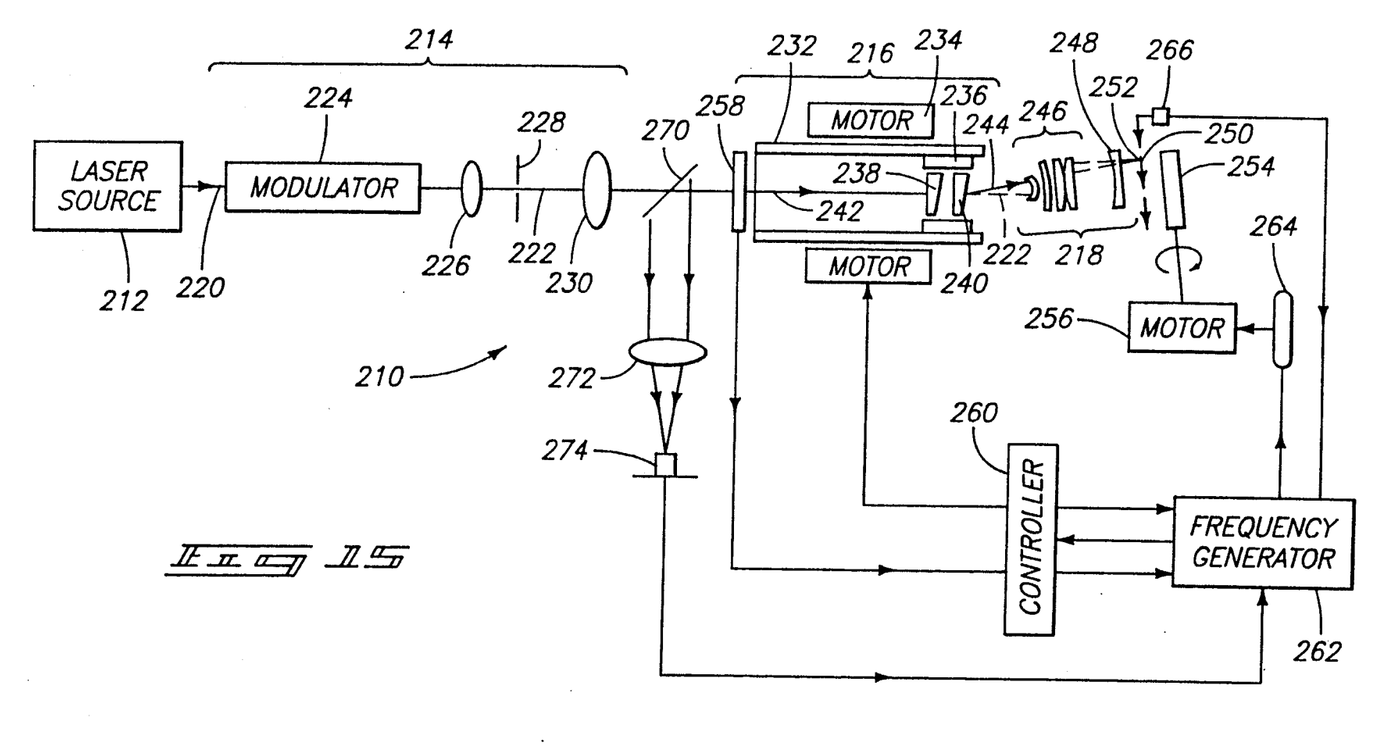
FIG. 15 is a diagrammatic illustration of a laser scanning system which is capable of both transferring data to a medium or collecting data from a medium.

FIG. 15 diagrammatically shows a laser scanning system 210 which is capable of both reading and writing data. Laser scanning system 210 includes a laser source 212, a beam manipulating assembly 214, a beam deflector assembly 216, a objective lens 218, a data collection system, and a control system.

Laser source 212 emits a laser beam 220 which is then expanded and collimated along an optical axis 222 by beam manipulating assembly 214. Beam manipulating assembly 214 comprises a modulator 224 which modulates laser beam 220, a beam expander 226 which increases the cross-sectional area of laser beam 220, a spatial filter 228 which cleans the beam by removing unwanted frequencies, and a beam collimator 230 which collimates the laser beam of uniform spatial frequency along the optical axis 222. The light received by prism 238 therefore has uniform spatial frequency.

Beam deflector assembly 216 includes a hollow shaft 232, a motor 234 which rotates the hollow shaft about optical axis 222, and first and second prisms 238, 240 mounted within shaft 232. Hollow shaft 232 includes a gear mechanism 236 which rotates prisms 238 and 240 about optical axis 222. Shaft 232, motor 234, and gear mechanism 236 provide a first drive means for synchronously rotating first prism 238 and second prism 240 about optical axis 222 in opposite directions. Prisms 238 and 240 may be single faceted prisms or multi-faceted prisms.

Prisms 238 and 240 receive laser beam 242 and deflect it as beam 244 toward objective lens 218. Objective lens 218 includes a focusing assembly 246 and a field flattening lens 248 which are identical to those described above with reference to FIG. 14. Objective lens 218 directs laser beam 244 to a laser scan spot 252 along scan lines 250 rectilinear on a data storage means 254.

Data storage means 254 may be any type of system which maintains data. For example, in a laser printer, data storage means may be a rotating photosensitive drum which receives optical images from the laser beam scanner and transfers these images to a recording medium, such as paper. In another system, data storage means 254 may be a film or tape that contains printed or other types of data which may be scanned in an effort to retrieve that data. In still another system, the data storage means may represent a surface for imaging purpose, such as the retina of the human eye. In the embodiment shown in FIG. 15, data storage means 254 is rotated at a desired velocity by a motor 256.

Laser scanning system 210 further includes a control system which consists of an encoder 258, an electronic controller 260, a reference frequency generator 262, a data storage controller 264 and a start of scan (SOS) detector 266. Electronic controllers 260 and 264 are preferably driver circuits which drive motors 234 and 256, respectively. Frequency generator 262 in its preferred form is a microprocessor or an ASIC.

The control system controls the velocities of motor 234 (which drives hollow shaft 232 and prisms 238, 240) and motor 256 (which drives data storage means 254). The control system includes feedback to accurately maintain a desired scan rate of the laser beam scanner and the speed at which data storage means 254 is rotated.

Laser scanning system 210 further includes a data collection system which consists of a beam splitter 270, a lens 272, and a sensor 274. Preferably, the data collection system is operable only when scanning system 210 is in a read mode and attempting to read data from data storage means 254. In this read mode, scanning system 210 operates as a collector by scanning the data provided on data storage means and analyzing the reflected light to gather the information contained on the data storage means. The data collection system senses reflected light from the data storage means and converts it to electronic data signals indicative of data maintained by data storage means which may be then further processed and used accordingly.

Beam splitter 270 is positioned along optical axis 222 in the path of laser beam 220 between beam manipulating assembly 214 and beam deflector assembly 216. Beam splitter 270 allows laser beam 220 to pass through along optical axis 222 in a rightward direction (relative to FIG. 15), but redirects light which is reflected from data storage means 254 back along optical axis 222 in a leftward direction (relative to FIG. 15). The light redirected by beam splitter 270 is guided to lens 272 which then focuses the light to a focal point at sensor 274. Sensor 274 detects the reflected light and converts it to an electronic data signal.

Although the invention has been described herein as comprising one or two prisms, more than two prisms may be employed and still remain within the scope of the invention.

The advantages of the present invention are numerous. Laser beam scanners constructed according to this invention can generate a mathematically perfect straight scan line which is free from across-scan error. Such scanners exhibit superior scan accuracy and repeatability.

The present invention provides a quality scan spot of very small dimensions. In one experiment, a laser beam scanner according to this invention generated a scan spot of 40 μm which was more than three times smaller than scan spots of 130-140 μm generated in conventional laser printers. Even smaller scan spots are possible if desired. The invention also provides a relatively long scan length due to its generous scan field angle. As a result of a smaller scan spot and a wider scan angle, a laser beam scanner according to the invention provides a very high resolution.

The invention can satisfy any demand for higher scan rates because the prisms offer a practically negligible load to the motor used to rotate them. As a result, smaller and very inexpensive motors may be used to rotate the prism. Contrast this advantage with conventional scanners which use a relatively heavy polygonal mirror with a sophisticated and expensive motor/shaft arrangement.

The present invention also provides a significant cost reduction. First, by using a prism deflector, wobble error is practically eliminated. Therefore, motors used to rotate the prisms need not be specially designed or fabricated to precision tolerances to reduce wobble. Very inexpensive motors can be used. Second, due to the scan accuracy of the invention, manufacturers may substantially relax their fabrication tolerances and thus drastically reduce their manufacturing costs.

The present invention is applicable to many areas of use among which include: laser printers, bar code reading, data reading from a film, medical application, laser microscopes, and photo transmission.

In compliance with the statute, the invention has been described in language more or less specific as to structural and methodical features. The invention is not, however, limited to the specific features described or shown, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A laser beam scanner comprising:
   laser source means for emitting a laser beam;
   a prism for receiving and deflecting the laser beam;
   a spherical lens for receiving the laser beam deflected from the prism and converging the laser beam; and
   a spherical reflector for redirecting the laser beam converged by the spherical lens to a laser scan spot along a scan line.

2. A laser beam scanner according to claim 1 further comprising:
   a hollow shaft, wherein the prism is mounted within the hollow shaft; and
   drive means for rotating the hollow shaft.

3. A laser beam scanner according to claim 1 wherein the prism is a multi-faceted prism.

4. A laser beam scanner according to claim 1 further comprising a beam altering means, positioned between the laser source means and the prism, for changing the laser beam to effectuate formation of a substantially circular laser scan spot along the scan line.

5. A laser beam scanner according to claim 4 wherein the beam altering means comprises two anamorphic prisms.

6. A laser beam scanner according to claim 1 wherein:
   the prism is rotated about an axis of rotation such that the laser beam deflected by the prism traces at least a portion of a substantially circular path on the spherical lens;
   the laser beam converged by the spherical lens converges to a focus point; and
   the spherical reflector has a center of curvature located on the axis of rotation and a radius of curvature $R_r$ defined by the following equation:

$$R_r = \frac{2ab}{2Rf\#\sin(\pi/N) - a}$$

wherein
   a = distance between a center of the spherical lens and the focus point;
   b = distance between the scan spot and a center of the spherical reflector;
   R = radius of the circular laser beam path on the spherical lens;
   f# = effective f-number at the scan spot; and
   N = number of circular entrance apertures accommodated on the circumference of the circular laser beam path of radius R.

7. A laser beam scanner comprising:
   laser source means for emitting a collimated laser beam along an axis;
   beam deflecting means for deflecting the collimated laser beam at an angle to the axis, the laser beam deflected by the beam deflecting means also being collimated;
   converging means, positioned to receive a portion of the collimated laser beam deflected by the beam deflecting means, for transforming the collimated laser beam into a converging, conical-shaped laser beam which converges to a focus point; and reflector means, positioned to intercept the conical-shaped laser beam before the laser beam reaches the focus point, for redirecting the conical-shaped laser beam to a laser scan spot along a scan line.

8. A laser beam scanner comprising:
   laser source means for emitting a laser beam;
   a prism for receiving and deflecting the laser beam;
   a spherical lens for receiving and converging the laser beam deflected from the prism;
   a spherical reflector for reflecting the laser beam converged by the spherical lens; and
   a scan lens for focusing the laser beam reflected from the spherical reflector to a laser scan spot along a scan line.

9. A laser beam scanner according to claim 8 further comprising:
   a hollow shaft, wherein the prism is mounted within the hollow shaft; and
   drive means for rotating the hollow shaft.

10. A laser beam scanner comprising:
    laser source means for emitting a laser beam;
    a multi-faceted prism for receiving and deflecting the laser beam;
    a folding mirror for reflecting the laser beam deflected from the multi-faceted prism; and
    a scan lens for focusing the laser beam reflected from the folding mirror to a laser scan spot along a scan line.

11. A laser beam scanner comprising:
    laser source means for emitting a laser beam;
    a prism for receiving and deflecting the laser beam;
    a folding mirror for reflecting the laser beam deflected from the prism;
    a scan lens for focusing the laser beam reflected from the folding mirror to a laser scan spot along a scan line; and
    a beam altering means, positioned between the laser source means and the prism, for changing the laser beam to effectuate formation of a substantially circular laser scan spot along the scan line.

12. A laser beam scanner according to claim 11 wherein the beam altering means comprises two anamorphic prisms.

13. A laser beam scanner comprising:
    light source means for emitting a collimated laser beam along an optical axis;
    first and second prisms rotatable about the optical axis; and
    drive means for synchronously rotating the first and second prisms in opposite directions, the first and second prisms receiving and deflecting the laser beam to define a selected pattern.

14. A laser beam scanner according to claim 13 wherein the first and second prisms are multi-faceted prisms.

15. A laser beam scanner according to claim 13 wherein the first and second prisms are four-faceted prisms and the selected pattern is a "+" pattern.

16. A laser beam scanner according to claim 13 wherein the first and second prisms are mounted within a hollow shaft having a longitudinal axis coinciding with the optical axis, the hollow shaft including gear means for rotating the first and second prisms in opposite directions.

17. A laser beam scanner according to claim 13 further comprising an objective lens for focusing the laser beam deflected from the first and second prisms to a laser scan spot along a scan line.

18. A laser beam scanner according to claim 17 wherein the objective lens comprises:
    a focusing assembly positioned to receive the laser beam deflected from the first and second prisms for focusing the laser beam to the scan spot; and
    a field flattening lens positioned to receive the laser beam from the focusing assembly for straightening the laser beam to place the scan spot on the scan line.

19. A laser scanning system having a write mode for writing data and a read mode for reading data, the laser scanning system comprising:
    laser source means for emitting a laser beam;
    beam manipulating means for expanding and collimating the laser beam along an optical axis;
    first and second prisms rotatable about the optical axis;
    first drive means for synchronously rotating the first and second prisms in opposite directions, the first and second prisms receiving and deflecting the laser beam;
    data storage means for maintaining data;
    an objective lens for directing the laser beam deflected from the first and second prisms to a laser scan spot along a scan line rectilinear on the data storage means;
    second drive means for rotating the data storage means;
    data collection means, operable when the scanning system is in its read mode, for sensing light reflected from the data storage means and converting the light to an electronic data signal indicative of data maintained by the data storage means; and
    control means for controlling operational velocities of the first and second drive means.

20. A laser beam scanner according to claim 19 wherein the first and second prisms are multi-faceted prisms.

21. A method for laser scanning comprising the steps of:
    emitting a laser beam;
    passing the laser beam through a prism to deflect the laser beam;
    passing the laser beam deflected by the prism through a spherical lens to converge the laser beam;
    guiding the converging laser beam to a spherical reflector; and
    reflecting the laser beam from the spherical reflector to a laser scan spot along a scan line.

22. A method according to claim 21 wherein the prism is a multi-faceted prism.

23. A method for laser scanning comprising the steps of:
    emitting a collimated laser beam along an axis;
    deflecting the collimated laser beam at an angle to the axis;
    after deflecting the collimated laser beam, transforming the collimated laser beam into a converging, conical-shaped laser beam which converges to a focus point; and
    redirecting the conical-shaped laser beam to a laser scan spot along a scan line.

24. A method for laser scanning comprising the steps of:
    emitting a collimated laser beam along an optical axis;
    passing the laser beam through a first prism aligned along the optical axis;

passing the laser beam through a second prism aligned along the optical axis adjacent to, and spaced from, the first prism; and synchronously rotating the first and second prisms in opposite directions while passing the laser beam therethrough.

25. A method according to claim 24 wherein the first and second prisms are multi-faceted prisms.

26. A laser beam scanner comprising:
laser source means for emitting a laser beam;
a prism for receiving and deflecting the laser beam;
a spherical lens for receiving the laser beam deflected from the prism and converging the laser beam; and
a spherical reflector for redirecting the laser beam converged by the spherical lens.

27. A laser beam scanner according to claim 26 wherein the prism is a multi-faceted prism.

28. A laser beam scanner according to claim 26 further comprising a scan lens for focusing the laser beam redirected from the spherical reflector to a laser scan spot along a scan line.

29. A laser beam scanner according to claim 26 further comprising drive means for rotating the prism.

* * * * *